United States Patent
Yager et al.

(10) Patent No.: US 6,950,944 B2
(45) Date of Patent: Sep. 27, 2005

(54) SECURITY CODE ACTIVATED ACCESS CONTROL SYSTEM

(76) Inventors: David Frank Yager, 8212 186th St. SW., Edmonds, WA (US) 98026; Michael Arthur Moratti, 24150 Madura Dr., Kingston, WA (US) 98346

( * ) Notice: Subject to any disclaimer, the term of this patent is extended or adjusted under 35 U.S.C. 154(b) by 596 days.

(21) Appl. No.: 09/683,338

(22) Filed: Dec. 16, 2001

(65) Prior Publication Data

US 2002/0112174 A1 Aug. 15, 2002

Related U.S. Application Data

(60) Provisional application No. 60/255,718, filed on Dec. 18, 2000.

(51) Int. Cl.[7] ............ H04L 9/00; G06F 11/30; H04K 1/00
(52) U.S. Cl. ............ 713/200; 713/167; 713/171; 713/193; 713/194; 713/202; 380/28; 380/274; 380/277; 705/57
(58) Field of Search ................ 713/200–202, 713/169, 170, 182; 380/277, 278, 281, 45, 47; 705/64

(56) References Cited

U.S. PATENT DOCUMENTS

| | | | | |
|---|---|---|---|---|
| 4,926,478 A | * | 5/1990 | Gruenberg ............ | 705/75 |
| 5,465,083 A | * | 11/1995 | Okamoto ............ | 340/5.54 |
| 6,026,166 A | * | 2/2000 | LeBourgeois ............ | 713/156 |
| 6,266,525 B1 | * | 7/2001 | Peterson ............ | 455/410 |
| 6,378,073 B1 | * | 4/2002 | Davis et al. ............ | 713/200 |

* cited by examiner

Primary Examiner—Kambiz Zand

(57) ABSTRACT

An access control system that utilizes security codes (500), a database (430), and a control device (20) is disclosed. Each security codes (500) is comprised of a unique key code (502) that provides security in addition to a use code (503) that is used to convey specific user defined functions. The use code (503) may be determined by the security code requester (400) at the time of security code (500) charge out from the database (430). The database (430) controls the issuance of security codes (500) and the control device (20) validates the key code (502) within the security code (500) against key codes (502) within control device (20) memory and if valid, performs an action based on the validation of the use code (503) parameters. As the key codes (502) that are within the control device (20) memory are used, the control device (20) then self-regenerates the key codes (502) in order to extend the control device (20) service life indefinitely. The database (430) and the control device (20) have security code (500) activities that are synchronized, though the two operate independently and are not electronically connected. The system provides a secure interface for obtaining access authority from the database (430). Security code requesters (400) contact the database (430) and request security codes (500) in order to activate a specific control device (20). After database (430) issuance, the security codes (500) are then input by the security code user (420) at the control device (20) location and activates the control device (20) if the key code (502) matches the key code (502) within the control device (20) and the use code (503) parameters are validated by the control device (20). The control device (20) and the database (430) key codes (502) are synchronized. This allows an unlimited supply of security codes (500) to be issued by the database (430) and used by the control device (20).

18 Claims, 7 Drawing Sheets

SECURITY CODE ACTIVATED ACCESS CONTROL SYSTEM

CROSS-REFERENCE TO RELATED APPLICATIONS

This application is related to and hereby claims the priority benefit of a provisional application entitled "A security code activated access control system." application No. 60/255,718 filed Dec. 18, 2000, by the present inventors.

STATEMENT REGARDING FEDERALLY SPONSORED RESEARCH OR DEVELOPMENT

Not applicable.

REFERENCE TO MICROFICHE APPENDIX

Not applicable.

BACKGROUND OF INVENTION

1. Field of Invention

The present invention relates to access control systems. In more detail an access control system for providing security codes consisting of key codes and use codes that are issued from a database to be input into a control device for activation of that control device after processing and validation of the security codes. The output of the control device may be used to activate any number of secure door locks, electrical appliances, mechanisms, or other applications that require a secure method of activation.

2. Description of Prior Art

Many applications exist where a secure access control system could save consumers and businesses time and money. One such application is the home and business pickup and delivery industry. Consumers utilizing package delivery services or other businesses that offer pickup or delivery services to their customers must 1) be at home, 2) make arrangements for a neighbor to receive delivery, or 3) settle with an unattended delivery. With the trend toward Internet utilization and consumer isolation there is a great need for a system that allows consumers and businesses to control access to homes and businesses in a convenient, safe, and affordable manner. The system must provide for the safety of the consumer and must be flexible enough to fit a multitude of applications that may be required by the consumer. Another application where a secure access control system would be of benefit is real estate lock boxes. Currently many realtors must coordinate schedules to pickup keys from home offices in order to show a home to a prospective client. Many times this results in lost sales since the timing may be inconvenient. A system that allows the realtor to utilize the Internet or telephone to obtain a security code to open the lock box would result in increased sales and cost savings for the realtor. There are hundreds of other applications where a secure access control system would be utilized such as movie and event access control or hotel room access control. It is clear that a system that allows an individual to be granted access authority remotely and the ability for that user to utilize a code for access has a place in the marketplace. In addition, a system that has the ability to provide a method for providing positive identification of who is utilizing the system is a needed feature for many situations. As with any security system, the system needs to be secure for all transactions and provide a simple and easy to use interface for all users.

The storage device described in U.S. Pat. No. 5,774,053 provided an enclosure for the storage of goods from theft, damage, and provides refrigeration. The Porter design has the control device integral to the enclosure and only allows vendor codes that allow access to the storage device. The design of the Porter storage device therefore, does not allow the consumer to control access to a specific location other than the storage device. The present invention allows consumers to install a control device into any door or opening in order to grant access to a home, business, or other specific location. In addition, the present invention is not limited to activation of a lock. It may be utilized to activate any appliance, mechanism, or application that requires a secure method of activation.

The prior art of U.S. Pat. No. 5,774,053 and U.S. Pat. No. 6,300,873 both have embodiments where the security code data is transmitted to the access control mechanism from remote locations. Having the security code data transmitted to or from remote locations introduces the possibility of network sniffers and other devices that can intercept network data and compromise security. The present invention has all security code data exist within the control device prior to usage and no security code data is input into the control device without secure data transfer methodologies.

U.S. Pat. No. 6,300,873 describes an embodiment where the access mechanism is connected to a remote database. This requires greater overhead on the remote database in order to send and receive data from the storage device. If many mechanisms are connected to the remote database, the amount of secure data transfer required may significantly decrease system performance. If decreased system performance is to be alleviated, there is a significant cost increase due to additional hardware and maintenance. The present invention does not require the use of a transmitting device and or remote communications connectivity on the part of the control device thereby reducing the hardware, wiring, setup complexity, and database overhead. This results in a lower cost to the consumer for control device installation and operation as well as lower cost for database operation.

The security of Internet and network transactions and the security of the home and workplace are prime concerns for the consumer. We have seen the criminal element seize any and all opportunity to exploit security weakness. The U.S. Pat. No. 5,774,053 design uses reusable vendor codes that have no specific expiration parameters and may allow unauthorized users to obtain a code and exploit this weakness. The use of the reusable vendor codes presents a security risk in that when an unauthorized individual obtains one of the vendor codes, that person has access until the code is removed from the list of valid codes for the device. This breach of security may take a significant amount of time to discover and reprogram the device with a new code. U.S. Pat. No. 6,300,873 utilizes access codes that expire after a single use. This appears to tighten security over U.S. Pat. No. 5,774,053 but eliminates any flexibility on the part of the consumer. If a consumer has a requirement to grant repeated use, they must charge out a multitude of access codes in order to accomplish this goal. Having a multitude of valid access codes issued to one individual to accomplish repeated use actually decreases system security. The access code user must keep track of multiple access codes rather than one code and this increases the risk of a misplaced or stolen access code thereby compromising system security. In addition, U.S. Pat. No. 5,774,053 and U.S. Pat. No. 6,300,873 do not have any method for the verification of who is actually utilizing the vendor code or access code at the control mechanism. Any individual who is able to obtain a valid vendor or access code can utilize either system if they are undetected prior to use. The present invention utilizes security codes that convey specific instructions and usage information from the database to the access control device. These instructions may be as rigid and specific as a single use at a single location at a certain time or as broad as repeated use within parameters set by the consumer. The parameters may include a multitude of different parameters as needed by system application. This allows a security code to be issued with specific expiration parameters and be valid for single or multiple transactions thus eliminating the need for multiple code charge out and thereby increasing system security. In addition, when the usage parameters to be verified include specific information about who is authorized to utilize the security code, this allows the control device to be activated only by authorized personnel. This methodology provides a significant increase of system security.

The U.S. Pat. No. 6,300,873 design utilizes access codes that may be generated by a cryptographically strong random number generator. This allows for a certain level of consumer confidence with the level of security afforded by this methodology. The present invention utilizes security codes that include a key code element and an use code element. The key code element may also be generated by a cryptographically strong random number generator. However, the two elements that comprise the security codes may also be embedded within each other in order to obscure which portion of the data is the key code and which portion is the use code. In addition, the pattern of embedding the data may be rotated from one security code to the next based on an algorithm. This methodology greatly enhances system security and consumer confidence.

The U.S. Pat. No. 5,774,053 design methodology utilizes a finite number of stored vendor codes that will run out after all codes are utilized. This creates a service life that is costly and may be unacceptable to the consumer. The present invention allows the security codes to be self-generating and still be in-sync with the database. Utilizing this methodology creates an unlimited number of security codes, greatly extends the usable service life, and reduces the cost of ownership to the consumer.

The ease of use by the user is an issue of importance. The U.S. Pat. No. 5,774,053 design utilizes vendor codes that may be lost or forgotten and which therefore require the homeowner and vendor to manually revise the codes. This method adds complexity to the already busy homeowner and vendor and therefore is an inconvenience and, in addition, could cost them time and money. The present invention utilizes a database that automatically assigns security codes to an authorized user and thereby eliminates the need for user intervention and increases the ease of use significantly. In addition, the present invention allows the security code data to be sent to the individual requiring access in the form of barcode labels that can be printed and that essentially act as a key for entry.

The U.S. Pat. No. 6,300,873 design utilizes a database that is accessed by a network and does not vary from this design. In addition, the design specifies having a third party control distribution of security codes. These methodologies do not allow for any consumer control and add cost for the consumer. The present invention allows a database application to be controlled by the consumer. The database application may reside on the consumer's personal computer, on a handheld computing device, or on a server database. The method of database security code distribution would be controlled by the consumer and could be changed from one method of distribution to another at any time. This methodology allows the consumer to have full control over the distribution of security codes further increasing the flexibility for the consumer while also allowing the consumer to eliminate any third party costs if they so desire.

The U.S. Pat. No. 5,774,053design utilizes a household power supply and uses a battery as backup power only. This limits where the storage device can he placed. The U.S. Pat. No. 6,300,873 design utilizes a battery for standby power that keeps the unit locked in the event of a primary power failure. The requirement of AC power for primary power requires that the mechanism be wired to a power source. This increases installation and operating costs. In addition, having the battery power source not allow continued unit operation in the event of power failure can cause missed deliveries and other user inconveniences. The present invention allows for continuous unit operation by AC power or battery power. In addition, the present invention allows for unit operation utilizing only battery power without the requirement for wiring to an AC power source. This allows almost unlimited placement of the control device as well as significant reduction to the cost of ownership for the consumer.

The lack of design and process flexibility is a major drawback and limitation of the prior art.

Objects and Advantages

In view of the foregoing, it is an object of the present invention to provide an access control system that allows greater consumer control, greater security, and greater flexibility of use by providing various options of functionality chosen by the system user thus avoiding the shortcomings and drawbacks of prior art systems and methodologies.

It is a more particular object of the present invention to provide an access control system that utilizes a database to centralize the administration of user and transaction information.

It is another object of the present invention to provide an access control system which utilizes security codes that contain embedded key codes and use codes. The embedded use codes convey specific instructions and information such as personnel information and usage instructions from the database to the control device thereby increasing system security and flexibility.

It is another object of the present invention to provide an access control system that allows a database to reside on the consumer's personal computer or handheld computing device, thereby providing the ability to eliminate any third party costs and increasing the consumer's control over issuance of security codes.

It is another object of the present invention to provide an access control system that allows the consumer to, at any time, switch between a database residing on the consumer's personal computer, handheld computing device, or server, thereby greatly enhancing consumer flexibility.

It is another object of the present invention to provide an access control system which does not require the control device or the database to have remote communications, thereby reducing purchase and operating costs.

It is another object of the present invention to provide an access control system which allows a database and control device to synchronize security code activities when the two are not electronically connected.

It is another object of the present invention is to provide an access control system that allows the system users to utilize access control parameters such as personnel identification, start time, stop time, single use, multiple use, and location in order to enhance consumer flexibility and increase system security.

It is another object of the present invention to provide an access control system that allows the control device to self-regenerate the security codes within it extending the control device service life indefinitely. This regeneration activity allows the control device and the database to remain in-sync.

It is another object of the present invention to provide an access control system that allow security codes to be sent to individuals or businesses in the form of barcode labels that act as a key for entry.

It is another object of the present invention to provide an access control system that allow security codes to be sent in an electronic data format that may be securely downloaded to a handheld computing device for user convenience and flexible usage.

It is another object of the present invention to provide an access control system which optionally allows a database to utilize network connectivity, as well as the ability to utilize a World Wide Web interface. This increases system flexibility and allows for ease of user interaction and data transfer.

It is another object of the present invention to provide an access control system that allows a database to have connectivity via multiple interfaces including but not limited to Internet and telephone dial up for ease of user interaction and data transfer.

Still further objects and advantages will become evident from a consideration of the ensuing description and drawings.

BRIEF DESCRIPTION OF THE DRAWING FIGURES

An embodiment of the present invention is described in detail below with reference to the attached drawing figures, wherein.

REFERENCE NUMERALS IN DRAWINGS

| | |
|---|---|
| 20 | Control device |
| 30 | Keypad |
| 40 | Display screen |
| 50 | LED |
| 52 | Key override |
| 60 | Wires |
| 70 | Scanner |
| 72 | Remote connection |
| 74 | Housing |
| 80 | Auxiliary I/O device |
| 85 | Battery |
| 90 | Remote alternate input device |
| 100 | Peripheral device |
| 110 | Controller |
| 400 | Security code requestor |

-continued

| | |
|---|---|
| 420 | Security code user |
| 430 | Database |
| 435 | Server |
| 440 | Handheld computing device |
| 450 | Personal computer |
| 500 | Security code |
| 501 | Archive value |
| 502 | Key code |
| 503 | Use code |
| 570 | Slave sliding window |
| 805 | Controller register |
| 815 | Database register |
| 827 | Archive cut-off point |
| 995 | Interface |
| 999 | Pointer id |

DETAILED DESCRIPTION OF THE INVENTION

Overview

An Access Control System that utilizes security codes and the methodologies for control and use of such codes are described below. Although discussed with reference to certain illustrated embodiments, upon review of this specification, those of ordinary skill in the art will recognize that the present invention may find application in a variety of systems. Therefore, in the following description the illustrated embodiments should be regarded as exemplary only and should not be deemed to be limiting in scope.

In general, the system and method of the present invention is practiced using a database that issues security codes that are then input into an access control device that is then activated upon the successful validation and processing of the security codes. The security codes contain key codes (which act as transaction keys) and use codes (which are usage instructions from the database to the access control device). The key codes may be generated using a cryptographically strong random number generator and the use codes may contain a multitude of specific usage instructions from the database to the access control device.

Security Code

Figure 2:
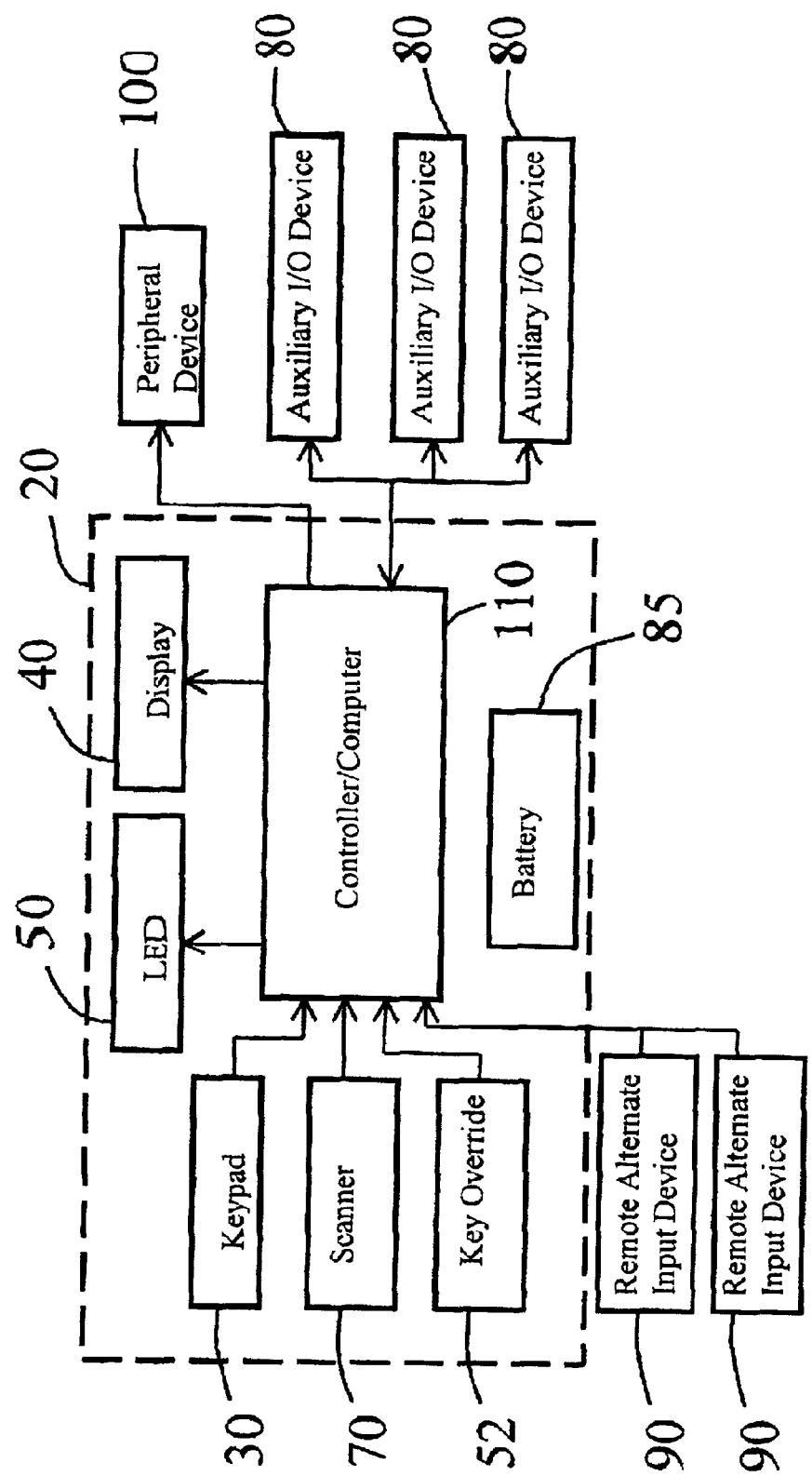
FIG. 2 is a schematic diagram of the control device controller.
Figure 4:
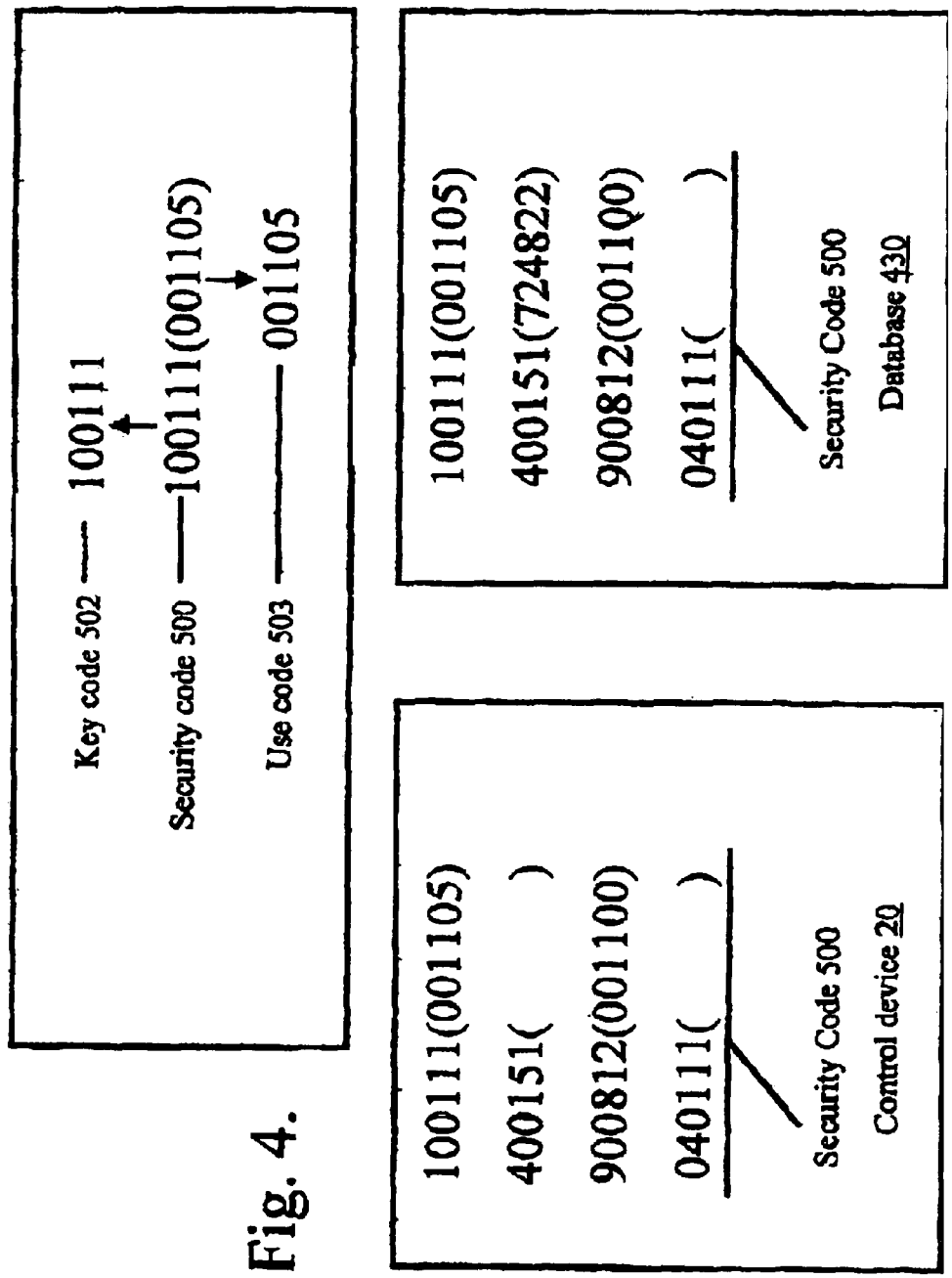
FIG. 4 is a schematic representation showing the control device and database security code relationship and structure.

As illustrated in FIG. 2, and FIG. 4, the present system allows for the secure transfer and usage of security codes 500 that consist of a key code 502 and use code 503. The key code 502 serves as a transaction key allowing activation of the control device 20. The use code 503 serves as a method of communicating transaction specific usage instructions from the database 430 to the access control device 20. The use code 503 portion of the security code 500 may be in a coded format so that the usage parameters and unit operation are obscured . Indeed the security code 500 may have the key code 502 and use code 503 embedded so that it is difficult to determine which part of the security code 500is the key code 502 and which part is the use code 503 thereby greatly increasing system security. The pattern of embedding the key codes 502 and use codes 503 within the security codes 500 may be different from one security code to the next based on an algorithm.

The use code 503 may be any combination of instructions for personnel identification, quantity of use, time parameter usage, location usage, or any other user defined parameter as required by the system application. Many system applications may require other specific parameters to be defined by the users or system administrator for the use code 503. Virtually any definable parameter as required by the system application may be inserted into the use code 503. One example may be where an individual grants another individual access to 'Door 3' for a specific two day period (time parameter usage). The use code 503 conveys the specific parameters to the access control device 20 and, if the key code 502 and transaction parameters are still valid, allows access to 'Door 3'. The individual can gain access to 'Door 3' unlimited times within the specific two day period. If the additional parameter of quantity usage is applied, the individual may be allowed a specific number of entries into 'Door 3' within the same two-day period. Another example of parameter usage is where an individual is authorized to activate the control device 20 on a specific date (time parameter usage) and if 'John Q. Public' is the user (personnel identification parameter). When the security code 500 is input at the control device 20 the input date matches the control device 20 date and the auxiliary I/O device 80 personnel identification value matches the use code 503 personnel identification parameter value, the control device 20 will be activated.

Database

In general, the database 430 has sufficient processing capability and memory to create and maintain transaction records, generate security codes, create and maintain user records, and create and maintain billing and financial data. All of the database 430 tasks are well known in the art.

Figure 3:
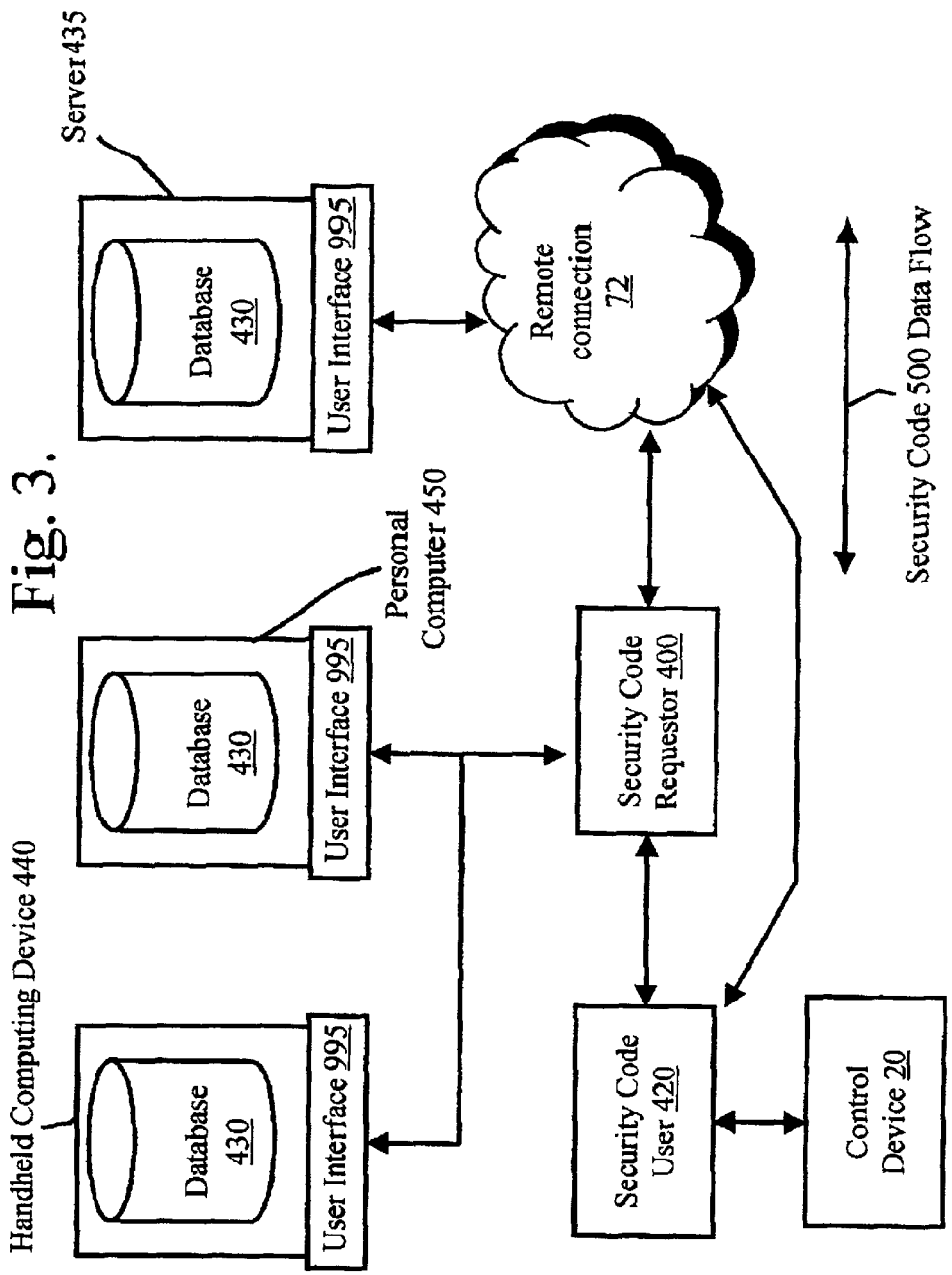
FIG. 3 is a schematic representation of the control device and database security code relationship and data flow between the control device, database, security code requester, and the security code user.

As best illustrated by FIG. 3 and FIG. 4, the database 430 contains a multitude of security codes 500 that are to be input into the control device 20. The security codes 500 are issued by the database 430 for each transaction to be made at the control device 20. The database 430 may contain security codes 500 for numerous control devices 20.

In one embodiment, the system would be configured to have the database 430 reside on a handheld computing device 440 that would have the ability to charge out unique security codes 500. The handheld computing device 440 may be a unit such as a Palm M505 manufactured by Palm or could be a handheld computing device exclusively manufactured for use with this system. The security codes 500charged out on the handheld computing device 440 by the database 430 would be unique from any other security code 500 source, and would also reside on the control device 20 and would be in-sync with the control device 20. The security code requester 400 establishes a local connection with the database 430 that resides on the handheld computing device 440 by utilizing a user interface 995. The user interface 995 may be an input form or other method of local database connectivity.

In another embodiment, the system would be configured to have a database 430 that would have the ability to charge out unique security codes 500 and would reside on a personal computer 450. The security codes 500 charged out by the database 430 residing on the personal computer 450 would be unique from any other security code 500 source. The security codes 500 would also reside on the control device 20 and would be in-sync with the control device 20. The security code requester 400 establishes a local connection with the database 430 that resides on a personal computer 450 by utilizing a user interface 995. The user interface 995 may be an input form or other method of local database connectivity.

In another embodiment, the system would be configured to have a database 430 that would have the ability to charge out unique security codes 500 and would reside on a server 435. The security codes 500 charged out on the server 435 by the database 430 would be unique from any other security code 500 source and would also reside on the control device 20 and would be in-sync with the control device 20. The server 435 and database 430would have the ability to transmit and receive data from a multitude of simultaneous remote connections 72. The methods of remote communication 72 with the server 435 and database 430 may be telephone interface, wireless (RF) interface, and/or network interface. The network interface may be dedicated or dialup interface/connection that utilizes a public computer network (such as the Internet) or a private computer network such as a wide area network (WAN), local area network (LAN), or virtual private network (VPN) that tunnels within a public network. The RF interface may support communication within a public (e.g. cellular) or private wireless network. The telephone interface may be a public switched telephone network (PSTN) via dialup modem connection, Digital Subscriber Line (DSL), cable modem, or other telephone network connection method. The network interface may include the ability for multiple dedicated connections. These dedicated remote connections 72 allow users that require a significant amount of transactions with the database 430 to maintain a single connection thus avoiding the added expense and inconvenience of establishing individual connections for each transaction. All network connectivity methods with the server 435 and the database 430 are all well known in the art. It may be advantageous to have more than one database 430 in order to provide timely transaction times. A configuration could have multiple databases 430 each in a specific geographic or network location in order to share database workload. The database 430 may also be configured for data replication in order for multiple databases to be in-sync and to share other specific tasks (such as user authentication) all well known in the art. In addition, the system could include a proxy server configured to provide a security firewall or have specific database tasks distributed to separate servers also all well known in the art. Utilizing a user interface 995, the security code requester 400 submits request data in order to complete a request for a security code 500. The user interface 995 may be an interactive telephone based input menu, an Internet web page input form, or other method of server 435 database 430 user interface 995. The user interface 995 is generally based on the remote connection 995 method.

Each security code 500 within the database contains a key code 502 and a use code 503. When a security code 500 is requested from the database 430, the use code 503 parameters are established. The use code 503 parameters may be automatically assigned based on the type of transaction, the location that the transaction will take place, or any other set of variables that are required by the application. In addition, the use code 503 parameters may be interactively assigned based on user input. Once the use code 503 parameters are established and validated, the use code 503 parameters are then placed into the security code 500 and assigned to the transaction by the database 430. In addition, the security code 500 may have the key code 502 and use code 503 embedded so that it is difficult to determine which part of the security code 500 is the key code 502 and which part is the use code 503 thereby greatly increasing system security. The pattern of embedding the key codes 502 and use codes 503 within the security codes 500 may be different from one security code to the next based on an algorithm. The security code 500 is then issued by the database 430 to the security code requester 400 or the security code user 420.

The database 430 may be configured to store all of the transaction specific information for the control device 20 for historical purposes. The database 430 may also be configured so authorized individuals can easily access account and transaction information.

Figure 7:
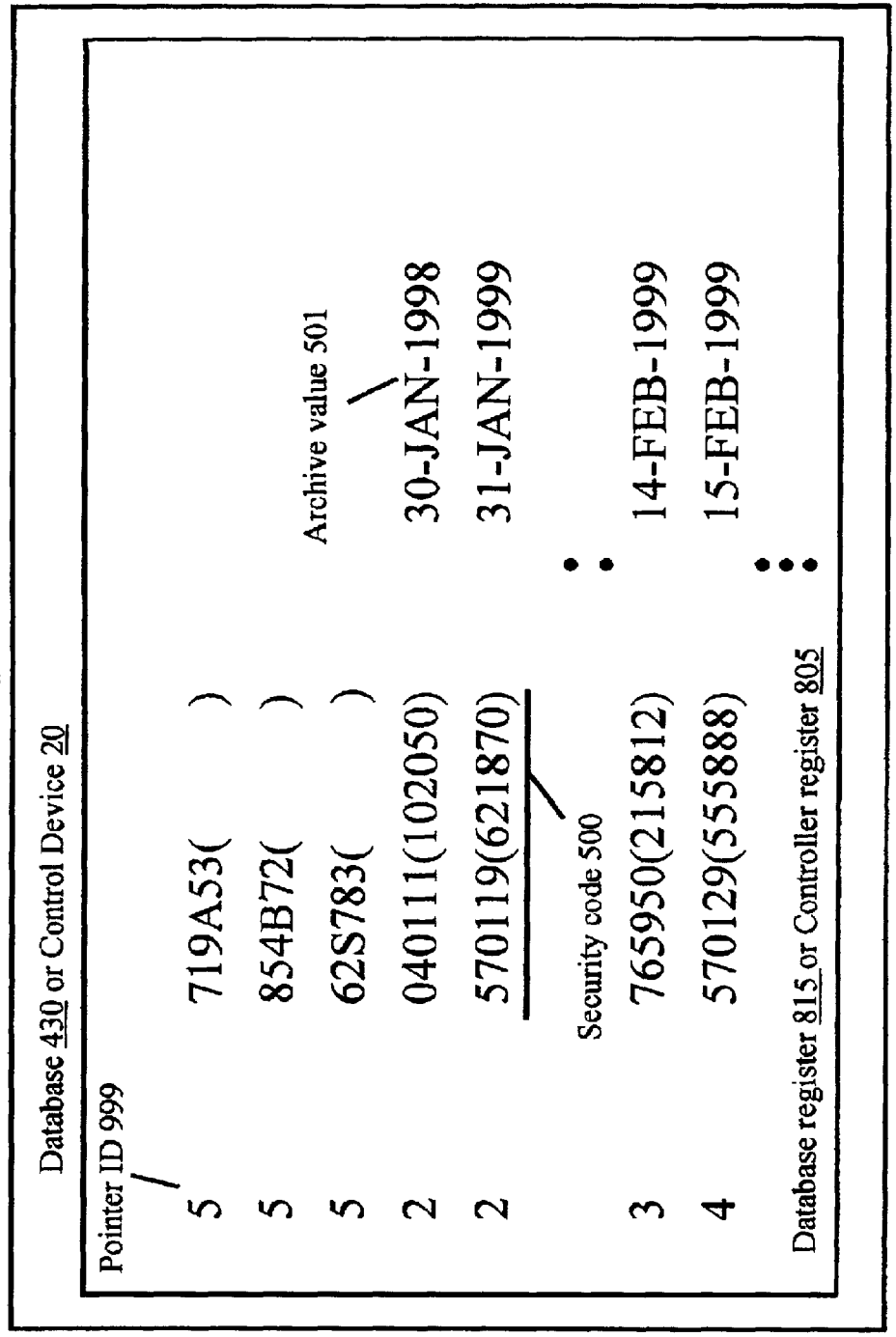
FIG. 7 is a schematic representation showing the security code regeneration function.

As best illustrated in FIG. 4 and FIG. 7, the database 430 maintains a list of the security codes 500 that are to be issued by the database 430 for the control device 20. The security codes 500 that are loaded into the control device 20 memory are also loaded into the database 430 and are noted as being for the specific control device 20. The security codes 500 are assigned by the database 430 for each transaction to be made at the control device 20.

As illustrated in FIG. 7, as the security codes 500 are issued by the database 430, archive values 501 are entered into the database register 815. When the first security code 500 is archived in pointer id 999 segment 4, a new segment of security codes 500 is created with the new values based on a predetermined algorithm that is the same as the algorithm of the control device 20. With the first security code 500 issued in each subsequent pointer id 999 segment the same or similar algorithm will be performed.

The security code regeneration algorithm will generate a new pointer id 999 segment and may perform a mathematical calculation, add alpha characters, and/or otherwise generate new security codes 500 values within the new pointer id 999 segment to be created. The new security code 500 values are not to be duplicates of the security codes 500 that have an archive value 501, the security codes 500 that are being modified, or of the security codes 500 that are still valid or unused. Within the new security code 500, the key code 502 values are to be the same for the pointer id 999 segment on the database 430 as its corresponding pointer id 999 segment on the control device 20. The security code 500 regeneration activity will also give the database 430 pointer id 999 segment the next available number that relates to the pointer id 999 segment number generated by the corresponding activity on the control device 20. In addition, the regeneration algorithm may also regenerate the pattern for embedding the key code 502 and use code 503 within the security code 500. All regeneration activity on the database 430 is similar to the regeneration activity on the control device 20 and ensures that the two remain in-sync.

In one embodiment, and as shown in FIG. 3, the security codes 500 may be electronically sent from the database 430 to the security code requestor 400 using a secure remote connection 72 but also may be transferred by other means such as mail or telephone.

Control Device

Figure 1:
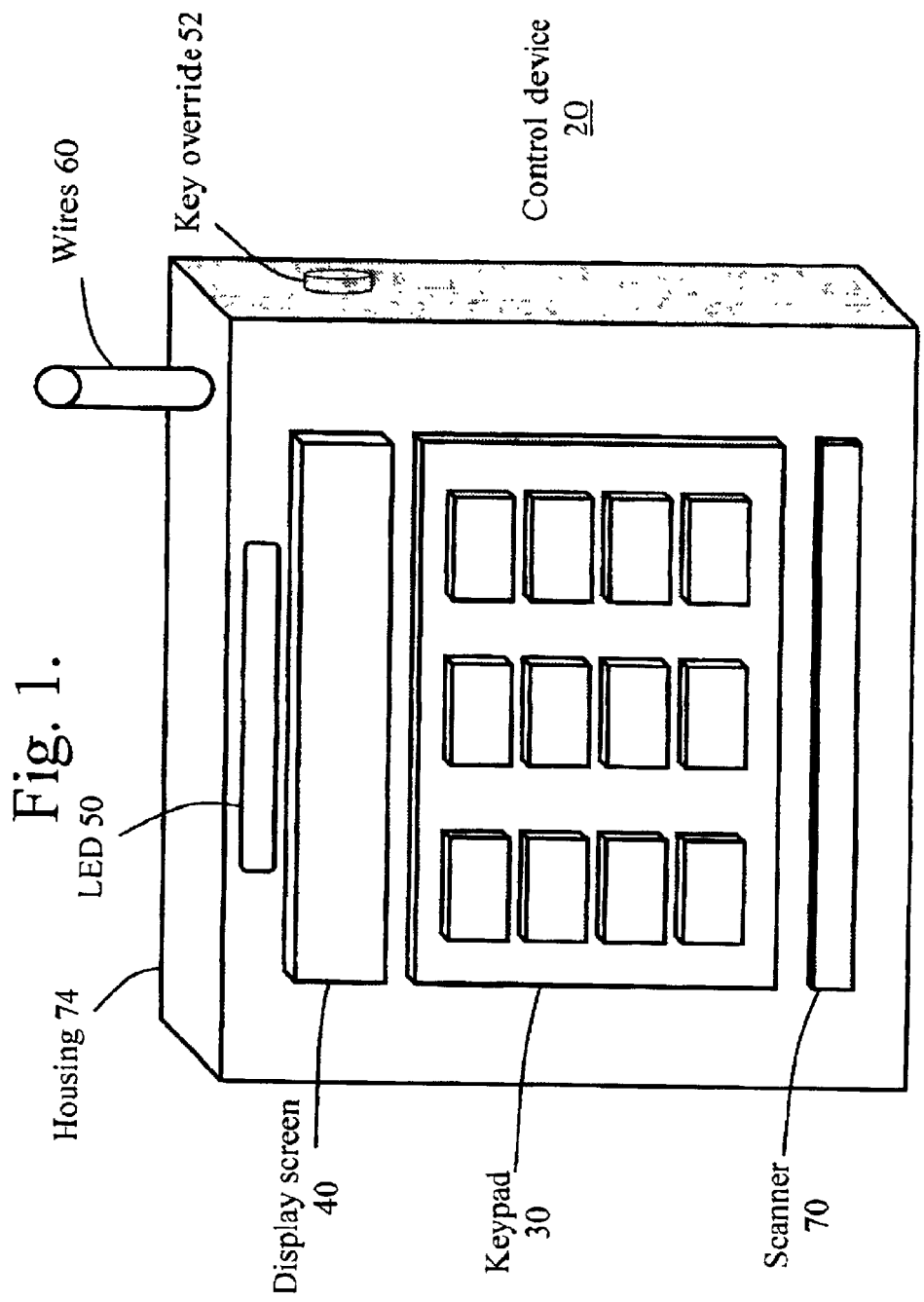
FIG. 1 is a perspective view of the control device.

As illustrated in FIG. 1 and FIG. 2, the access control device includes a housing 74 that encloses the internal components, a battery 85 for power, an input device, and a controller 110.

In more detail, the housing 74 may be constructed of any suitable material and is preferably approximately 4 inches tall, 6 inches wide, and 1 inch deep. Depending on the specific application, an additional housing cover may be utilized in order to protect the control device from exposure to the elements. In a further embodiment, the housing may be integrated into a structure such as a building or integrated into an object such as a kiosk that are frequently found at shopping malls. The physical design and size of the housing is not critical to the present invention.

As best illustrated in FIG. 1, FIG. 2, and FIG. 4, the control device 20 includes a controller 110 for controlling unit operation and for the processing and storage of data. The control device 20 also includes a scanner 70 for permitting the entry of barcode based security codes 500, a conventional key override 52, and a conventional alphanumeric keypad 30 for permitting the entry of alphanumeric security codes 500. In addition, the control device 20 also includes a battery 85, a display screen 40, and LED 50 display. The control device 20, is functionally coupled with the peripheral device 100 and activates the peripheral device 100 upon validation of a security code 500. The control device 20 has the ability to be connected to and activate a multitude of peripheral devices 100.

As described in more detail below, the control device 20 sends an output signal to the peripheral device 100 only when the correct security code 500 has been entered into the scanner 70, the keypad 30, or the remote alternate input device 90. The remote alternate input device 90 may be a device such as a electronic card reader, a magnetic strip reading device, a voice recognition device, a handheld computing device, a fingerprint identification system, a radio signal controlled device, an infrared transmitter, or smart card having a microchip embedded on it. Any or all of the above input methods may be utilized alone or in combination.

As illustrated in FIG. 2, the controller 110 is electronically coupled with the scanner 70, the keypad 30, display screen 40, LED 50, the alternate input device 90, the auxiliary I/O device 80, and the peripheral device 100.

As illustrated in FIG. 1 and FIG. 2, the wires 60 provide electrical connectivity to the peripheral device 100, remote alternate input devices 90, and auxiliary I/0 devices 80. The connectivity may also be accomplished by radio controlled, infrared, or other wireless methodologies that are well known in the art.

In one embodiment and as illustrated in FIG. 2, the control device 20 receives all electrical power for unit operation from a battery 85. In another embodiment, the wires 60 may provide electrical power to the control device 20 for unit operation, and the battery 85 provides backup power in the event of a power failure. The battery backup feature may allow for continuous unit operation or a standby mode to ensure system security.

In one embodiment, as illustrated in FIG. 1 and FIG. 2, the controller 110 is functionally linked to the LED 50 display and sends a signal to the LED upon validation of the input security codes. If the input security code is valid then a green LED will be activated and if it is invalid then a red LED will be activated. This allows user visual verification of transaction success or failure. In another embodiment, the display 40 may convey transaction related messages, general information and transaction success or failure information.

As best illustrated in FIG. 1 and FIG. 2, the control device 20 includes a display screen 40 that displays transaction status messages and other messages and data that may be loaded into the memory of the controller 110. These messages and data may be loaded into memory by scanning barcode data, entering data into the keypad 30, or utilizing other input methods such as electronic download from a hand held computer, or a magnetic strip reading device. If any transaction specific messages are input by way of the scanner 70, alternate input device 90, or keypad 30, that data may placed in controller memory relative to the transaction by the controller 110. This message system may also include the ability record an audio message on a magnetic tape, or record an audio message digitally to be stored in the memory of the controller 110. The display screen 40 may be a LCD, CRT, LED or similar type screen that is suitable for either indoor or outdoor usage. The particular application of the system will determine which display screen 40 is best suited for that application.

As illustrated in FIG. 2 and FIG. 4, the controller 110 is preferably a conventional programmable logic controller (PLC), a microcomputer or other microprocessor device such as the DS5000T manufactured by Dallas Semiconductor Inc. The controller 110 has timer functionality internal to it and is able to generate timer values as needed for unit operation. The controller 110 has conventional memory for storing a plurality of security codes 500. The security codes 500 may be loaded into memory during the manufacture process or may be loaded at a later date using conventional data transfer processes and media such as floppy disk, CD ROM, or secure electronic download which are all well known in the art.

Figure 5:
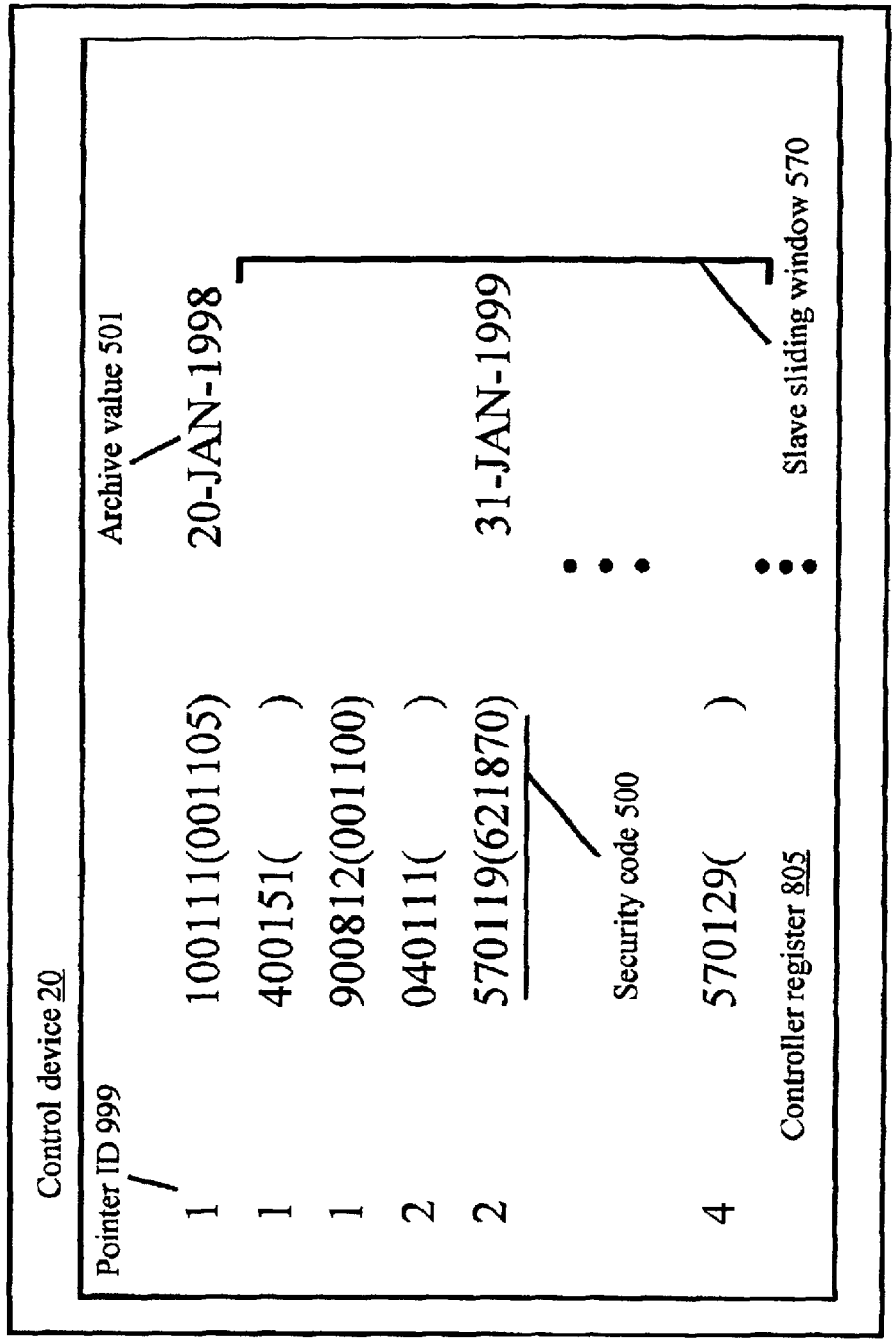
FIG. 5 is a schematic representation showing the control device controller register slave sliding window function.

As illustrated in FIG. 2, FIG. 4, and FIG. 5, whenever a security code 500 is input by the scanner 70, the keypad 30, or remote alternate input device 90, the security code is transmitted to the controller 110. When the controller 110 processes the input security code 500 it extracts the key code 502 and use code 503 elements from the security code 500. The controller 110 then determines if the key code 502 is valid by comparing the key code 502 to active key codes 502 in controller 110 memory. The controller 110 only compares the key code 502 to the stored key codes 502 within the slave sliding window 570.

In more detail, when the controller 110 reads the key codes 502 within the slave sliding window 570 it references from the lowest pointer id 999. In addition, the controller 110 also references the key codes 502 sequentially from first in memory to last in memory starting at the lowest pointer id 999, and the archive value 501.

In more detail, the slave sliding window 570 acts on the controller register 805 to limit the amount of security codes 500 within the controller 110 memory that are available to be compared to the input security code 500. The slave sliding window 570 moves along the controller register 805 and its size is determined by the lowest unused security code 500 in memory and the highest archived security code 500 in memory. The slave sliding window 570 always is extended a predetermined number of codes past the highest archived security code 500. As security codes 500 are input and validated, the window adjusts according to which security code 500 is archived.

If the key code 502 portion of the input security code 500 is valid, the controller 110 then evaluates the input use code 503 against information in memory or to data from the remote auxiliary I/O device 80. If it is the first input of the security codes 500, the controller 110 may load the use code 503 parameters from the input use code 503 into the controller 110 memory. The controller 110 then analyzes the parameters within the use code 503 for the transaction instructions and sends the appropriate output to the peripheral device 100 and/or an auxiliary I/O device 80 based on that analysis. The controller 110 then updates, as required, the use code 503 parameters within controller 110 memory.

In more detail, an example of use code 503 parameter updating is when the input security codes is quantity of usage based and is valid for four validations. Upon first usage of the security code 500 the use code 503 parameters are set to a quantity of four validations allowed with three validations remaining. Upon the next validation, the quantity of validations remaining would be two and so on until the use code 503 parameters expire. When the use code 503 parameters expire, the controller 110 then places an archive value 501 stamp on the security code 500 in memory. This serves to record that the use code 503 parameters have expired and as a method for rendering that security code 500 obsolete. The archive value 501 also serves as a reference point for operation of the slave sliding window and the security code 500 regeneration algorithm.

Figure 6:
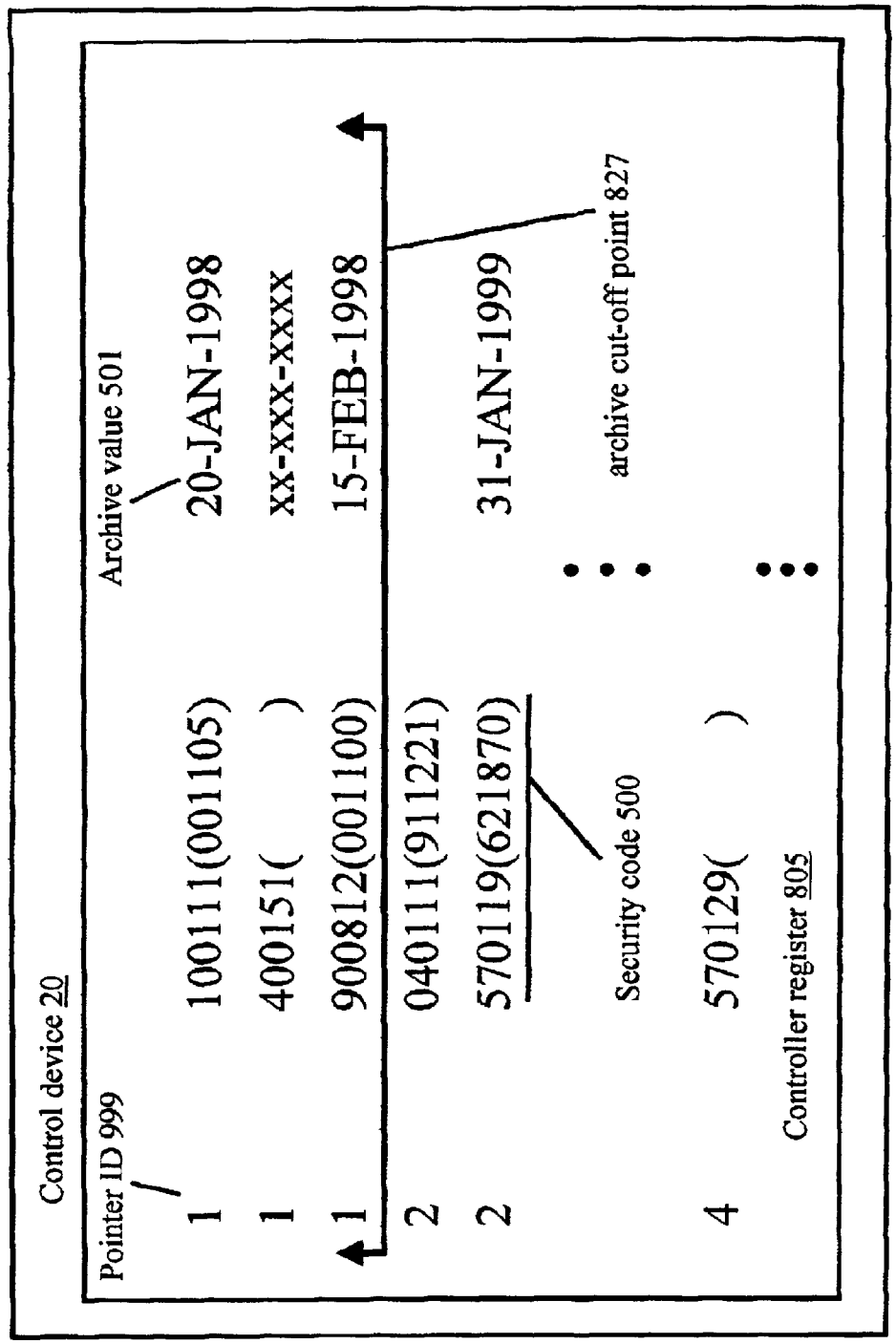
FIG. 6 is a schematic representation showing the control device security code archive function.

As illustrated in FIG. 2 and FIG. 6, as archive values 501 are added to the security codes 500 in controller 110 memory, they become obsolete and cannot be utilized again. In addition, the controller 110 is programmed to archive all security codes 500 that have the same or lower pointer id 999 and are sequentially lower then the archive cutoff point 827. In more detail, the archive cut off point 827 is the sequentially highest archived security code 500 that is at least one year older than the controller 110 timer value. This is a predetermined date value and may be any timeframe needed for a specific application of the system. In another embodiment, the archive cut-off point 827 is always a specific number of security codes 500 sequentially above the highest archived security code 500. The controller 110 timer value may be a standard date format or may be some other value in order to obscure expiration parameters and unit operation.

As illustrated in FIG. 2, FIG. 4, and FIG. 5, within the .controller 110 memory, the slave sliding window 570 low position begins at the first security code 500 in pointer id 999 number 1 in the controller register 805 memory. The slave sliding window 570 high position is always a predetermined number of security codes 500 past the highest archived security code 500. As more security codes 500 are archived the slave sliding window 570 gradually moves along the controller register 805. When the first security code 500 is archived in pointer id 999 number 4, all security codes 500 in pointer id 999 number 1are modified to new values based on a predetermined algorithm.

The security code 500 regeneration algorithm may perform a mathematical calculation, add alpha characters, and/or otherwise modify the security code 500 values within the pointer id 999 to be modified. The new security code 500 values are not to be duplicates of the security codes 500 that have an archive value 501, the security codes 500 that are being modified, or of the security codes 500 that are still valid or unused. The security code regeneration activity will also renumber the pointer id 999 number that is being modified to the next available number. The security code regeneration activity will then clear the archive values 501 and any use code 503 values for the newly renumbered pointer id 999 making the security codes 500 within that segment valid and unused. In addition, the regeneration algorithm may also regenerate the pattern for extracting the embedded key code 502 and use code 503 from the security code 500. All regeneration activity on the control device 20 is similar to the regeneration activity on the database 430 and ensures that the two remain in-sync.

In a further embodiment, the system would be configured to have the control device 20 controller registers 805 would contain a static amount of security codes 500 and not self-regenerate. In this embodiment the controller registers 805 may be on a removable memory chip that could be easily replaceable. In addition, the database 430 would be configured to have the same static values for the security codes 500 thereby ensuring that the two are in-sync.

The controller 110 may also be configured to activate a video camera upon input of a security code 500 in order to record the activities of the individuals utilizing the control device 20.

The controller 110 may be equipped with an alarm for security and programmed to activate the alarm if an individual attempts a certain number of invalid security code 500 entries or otherwise tampers with the control device 20. In addition, the controller 110 may be configured to have provisions for connectivity to alarm systems in order to create a comprehensive security system.

The control device may be configured to issue an audio alert for the input security code 500 validation status. This could have a series of audio messages each corresponding to a specific action of the control device 20. This could be beneficial for the sight impaired.

In a further embodiment, the system would be configured to have the control device 20 controller 110 contain several separate controller registers 825 each operating independently of each other. This would allow several sources to function as databases 430.

Operation

In operation, and as illustrated in FIG. 3 and FIG. 4, a control device owner upon purchasing a control device 20 registers their control device 20. This registration updates the database 430 with specific data required to assign transactions for the control device 20. Information such as address of installation, serial number, or other specific data may be required in order for transactions to be assigned security codes 500 for the specific control device 20. The registration information is communicated to the database by an input form. When the database 430 resides on a server 435, the method of registration may be mail, telephone, or web-based. The registration process then links the specific control device 20 with a specific usage location.

Once the control device owner has registered their control device 20, a security code requestor 400 may then contact the database 430 and utilize an input form to request a security code 500. During the request process, the security code requestor 400 enters specifics concerning the transaction. The transaction specifics may include any usage parameters that are to be placed into the use code 503. The usage parameter data may be entered in specific fields of an input form and then sent to the database 430. The issuance of the security code 500 is predicated upon validation of those specifics by the database 430. During the request validation process the security code requestor 400 contacts the database 430 and submits a request for a security code 500 which may include the usage location address, control device identification number, as well as any other specific data that may be required for validation (such as a password).

The database 430 then compares the submitted request data to the data stored within its records to see if there is a match. If there is a conflict, the security code requestor 400 is requested to perform corrections as necessary to complete the request process. When the data submitted to the database 430 is correct, the database 430 creates an transaction record and assigns a security code 500 to that record. The security code 500 includes, embedded within it, a key code 502 and a use code 503. In addition, within the use code 503 are any usage parameters required by the transaction for input at the control device 20. The database 430 then issues the security code 500. In one embodiment, the security code requestor 400 or security code user 420 then may send the security code 500 data to a printer to print a barcode label that is then utilized to activate the control device 20. The encoded barcode label provides access to the control device 20 upon usage after validation of the security code 500 key code 502 and use code 503 parameters. In another embodiment, the security code requester 400 or security code user 420 may place the security codes 500 provided by the database 430 on a label by writing and then refer to the label for keypad entry. In another embodiment, the security codes 500 may be electronically downloaded into a computer system for further transfer or reference.

In one embodiment, the server 435 database 430 request process allows for the security code requestor 400 to contact the database 430 via a remote connection 72. A telephone based menu user interface 995 or an online web input form may then be utilized to request a security code 500.

As illustrated in FIG. 3 and FIG. 4, the security code 500 is input into the control device 20 by the security code user 420. The security code 500 then grants access if the security code 500 data is successfully validated by the control device 20. After a successful transaction, the control device 20 updates the use code 503 parameters, as required, and archives the security code 500 by placing an archive value 501 upon that record if the use code 503 parameters have expired.

If any messages are to be relayed they are input using the scanner 70, alternate I/O device 90, or the keypad 30 by the security code user 420 for viewing on the display screen 40 by others.

SUMMARY, RAMIFICATIONS, AND SCOPE

Described herein is a system for providing enhanced access control that may be used in a variety of different applications. The present invention improves upon previous systems in that it gives the system user improved security and greater flexibility by adding user defined functionality to a secure access control system. In addition, the present system may be used without a communication apparatus such as an internet connection. This decreases the chance of data interception, decreases connection costs, eliminates third party database administration costs, and allows for use in remote areas not having network access. The system may optionally be combined with a communication system (such as the internet) to provide easier access for additional users if beneficial to the consumer.

The system is generally composed of two parts. 1) Issuing codes from a database and, 2) entering issued codes into a control device to gain access or perform a function. The codes contain a unique "key" generated by the database and used for comparing and validation at the control device. The codes also contain functional "use" information defined by the user at the time the code is issued from the database. The use information defines options read by the control device such as how many times a code may be used, who may use the code, when the code may be used, location where the code may be used, or a number of other customized options which may be predetermined by the system user. The database and the control device are located remotely from each other but have no electronic link between them. The database utilizes an algorithm to regenerate and issue unique codes infinitely. The control device utilizes the same algorithm as the database to anticipate the codes issued from the database. Both the database and control device maintain a rolling cache of valid codes so that the chronological order of inputted codes may vary from the order of issued codes without loss of synchronicity between the two.

The following description exemplifies one of the many possible options for use. A consumer places an order by mail for a new computer system from a mail order catalog. The new computer comes with a printer, and the computer and printer are shipped in two separate boxes. The two separate boxes may not shipped the same day, as the printer is back ordered. The consumer charges out a security code and changes the user defined parameters to make the code valid for two activations. The security code is supplied on the mail order form along with the address and any other pertinent information sent by mail to the computer company. While processing the order, the computer company delivery service places the security code into the control device by keypad (or possibly barcode reader). This gains access to a secure area for delivery of the first package. Several days later, the same shipping company arrives with the second package and once again enters the same security code found on the shipping label. Once again (because of the use parameters), the secure area is accessed and delivery of the second package is accomplished. Upon entering the security code the second time, the control device recognizes the use parameters embedded in the code and archives the code rendering it invalid for further use. The preceding example illustrates how the present invention may be user configured to facilitate different access control requirements and also illustrates that the system may function without the need for an internet connection or any other type of network or communication device.

Accordingly, the reader will see that the access control system of this invention allows for greater consumer safety, greater security, less complexity, greater flexibility, and an easier mode of operation. Furthermore, the access control system has the additional advantages in that It permits the use of a database that automatically assigns security codes thereby eliminating the need for user intervention;

It permits the use of use codes that convey transaction specific instructions from the database to the control device thereby adding flexibility of consumer use and strengthening system security;

It permits the system users to determine access control parameters such as personnel identification, start time, stop time, single use, multiple use, and location. This information is then embedded within the security code in order to enhance consumer flexibility and increase system security;

It allows the control device to self-regenerate the security codes within it. This regeneration activity allows the control device and the database to remain in-sync and extends the control device service life indefinitely;

It allows the database and control device to synchronize security code activities when the two are not electronically connected;

It allows a database to reside on the consumer's personal computer or handheld computing device, thereby providing the ability to eliminate any third party costs and increasing the consumer's control over issuance of security codes;

It permits the ability to utilize Internet technology within the system without requiring an Internet connection by the consumer thereby reducing the cost to the consumer;

It allows the consumer to, at any time, switch between a database residing on the consumer's personal computer, handheld computing device, or server, thereby greatly enhancing consumer flexibility;

It allows greater flexibility and scope by giving the consumer the option to assign security codes to non Internet transactions such as mail orders and phone orders.

It allows an unlimited number of security codes to be generated by the system and utilized by the control device thereby greatly extending the system Although the description above contains many specificities, these should not be construed as limiting the scope of the invention but as merely providing illustrations of some of the presently preferred embodiments of this invention. For example; an additional embodiment is for the use of multiple screens at the control device location each for a specific type of message.

Additionally, another embodiment of the invention might include a plurality of control devices grouped together in a common area of a housing subdivision, apartment complex, or business park similar to the way mailboxes and intercoms are grouped. Each control device would be related to a street address, suite number, or apartment number and would be only used by that location.

We claim:

1. A system for access control comprising:
   a database, said database including, a user interface having means to generate key codes and add user codes whereby issuing a security code with user defined parameters, a control device comprising:
   an input device for entering security codes;
   a multitude of key codes stored in a memory equivalent to key codes generated by said database and,
   a controller with programming having means to compare key codes inputted, to key codes in the memory and, when equal, interpret said user code whereby performing a required output relative to said user code parameters;
   wherein said database and the control device are not electrically connected and, have security code activities that are synchronized, and wherein said database and the control device operate independently; and
   the control device further including a software program having means to limit said key codes in the memory available for comparison to inputted security codes from a total key codes in the memory.

2. The system as set forth in claim 1, wherein said user codes are defined by user input via said user interface.

3. The system as set forth in claim 2, wherein said user input may be selected from a group consisting of personnel identification, time based, multiple use, single use, location based, or limits set for a peripheral device.

4. The system as set forth in claim 1, wherein said database may reside on a computing device selected from a group consisting of a personal computer, a handheld computing device, or a server.

5. The system as set forth in claim 1, wherein said key codes and said user codes are cryptically embedded within said security code.

6. The system as set forth in claim 1, said database further includes a software program and algorithm having means to regenerate key codes to new key codes after being issued.

7. The system as set forth in claim 1, said database further includes a software program having means to accept input of transaction specific data associated with each security code issuance.

8. The system as set forth in claim 1, wherein said input device being selected from a group consisting of a keypad, a card reader, a barcode reader, a radio frequency transmitter, an infrared transmitter or an auxiliary input device.

9. The system as set forth in claim 8, wherein said auxiliary input device being selected from a group consisting of relays, switches, sensors, potentiometers, gauges or controls.

10. The system as set forth in claim 1, the access control device further including a software program having means to archive security codes after use.

11. The system as set forth in claim 10, the software program further including an algorithm having means to regenerate key codes to new key codes equal to newly regenerated key codes in said database.

12. The system as set forth in claim 1, the control device further including a software program having means to recognize valid security codes inputted when said security codes are inputted in a different sequential order than issued from said database.

13. The system as set forth in claim 1, the control device further including a software program having means to interpret the user defined parameters of the inputted user code and perform a function relative to the user code parameters.

14. A method for access control comprising:

utilizing a computer program and a database having a user interface to generate key codes, storing the key codes, add a user code comprised of user defined parameters and provide a security code to an access control user, said access control user inputs the security code into a control device via an input device, said control device having key codes stored in a memory equivalent to said key codes stored on the database, said control device further including a software program having means to limit key codes in the memory available for comparison to inputted security codes from a total key codes in the memory, said control device compares inputted key codes to those in the memory and if valid, interprets the user code of the security code to perform a required output, wherein the database and said control device are not electrically connected and have security code activities that are synchronized, wherein the database and said control device operate independently.

15. The method as set forth in claim 14, wherein said user defined parameters may be selected from a group consisting of, personnel identification, start time, stop time, elapsed time, multiple use, single use, location of use, or limits set for a peripheral device.

16. The method as set forth in claim 14, the database further including a software program and algorithm with means to regenerate key codes to new key codes after being issued.

17. The method in claim 14, said control device further including a software program and algorithm having means to archive used security codes and regenerate key codes to new key codes equal to newly regenerated key codes in the database.

18. The method in claim 14, said control device further including a software program having means to recognize valid security codes inputted when said security codes are inputted in a different sequential order than issued from the database.

* * * * *